United States Patent [19]

Wilson et al.

[11] 3,716,276

[45] Feb. 13, 1973

[54] QUICK SERVICE VALVE DEVICE

[75] Inventors: Richard L. Wilson, Monroeville; Daniel G. Scott, Apollo, both of Pa.

[73] Assignee: Westinghouse Air Brake Company, Wilmerding, Pa.

[22] Filed: Oct. 27, 1971

[21] Appl. No.: 193,106

[52] U.S. Cl. .................................... 303/82, 303/36
[51] Int. Cl. .............................................. B60t 17/04
[58] Field of Search ........................... 303/36–39, 82, 303/83

[56] References Cited

UNITED STATES PATENTS

| | | | |
|---|---|---|---|
| 3,160,447 | 12/1964 | McClure et al. | 303/83 |
| 3,175,871 | 3/1965 | Wilson | 303/82 |

*Primary Examiner*—Duane A. Reger
*Attorney*—Ralph W. McIntire, Jr.

[57] ABSTRACT

This invention relates to a continual quick service valve device operative sequentially with each successive brake pipe pressure reduction over the entire service application range of brake pipe pressure reductions to effect "quick service" transmission through a train brake pipe of a pressure reduction wave. Fluid under pressure heretofore released from the quick action chamber of a conventional brake control valve device to atmosphere upon effecting a service reduction of brake pipe pressure is supplied to one side of an abutment to cause it to open a quick service valve that establishes a communication between the train brake pipe and a quick service volume. This abutment also constitutes a snap-acting valve for controlling flow between the quick service volume and atmosphere and simultaneously effecting a change in its effective area. Consequently, so long as the one side of this abutment is subject to fluid under pressure released from the quick action chamber, it successively deflects in opposite directions to operate the quick service valve for controlling flow from the train brake pipe to the quick service volume and simultaneously, acting as a valve, repeatedly first cuts off flow from the quick service volume to atmosphere and thereafter releases to atmosphere the fluid under pressure supplied to this volume from the train brake pipe. Means are provided for constantly releasing to atmosphere at a restricted rate the fluid under pressure supplied to the one side of the abutment so that upon movement of the brake control valve device from its service to its lap position, the repeated operations of the continual quick service valve device are terminated. However, upon any subsequent movement of the brake control valve device from its lap position to its service position in response to a manually effected further reduction of brake pipe pressure, this continual quick service valve device will operate in the manner described above to repeatedly first vent fluid under pressure from the brake pipe to the quick service volume and thereafter release this fluid under pressure from this volume to atmosphere until the brake control valve device returns to its lap position.

16 Claims, 3 Drawing Figures

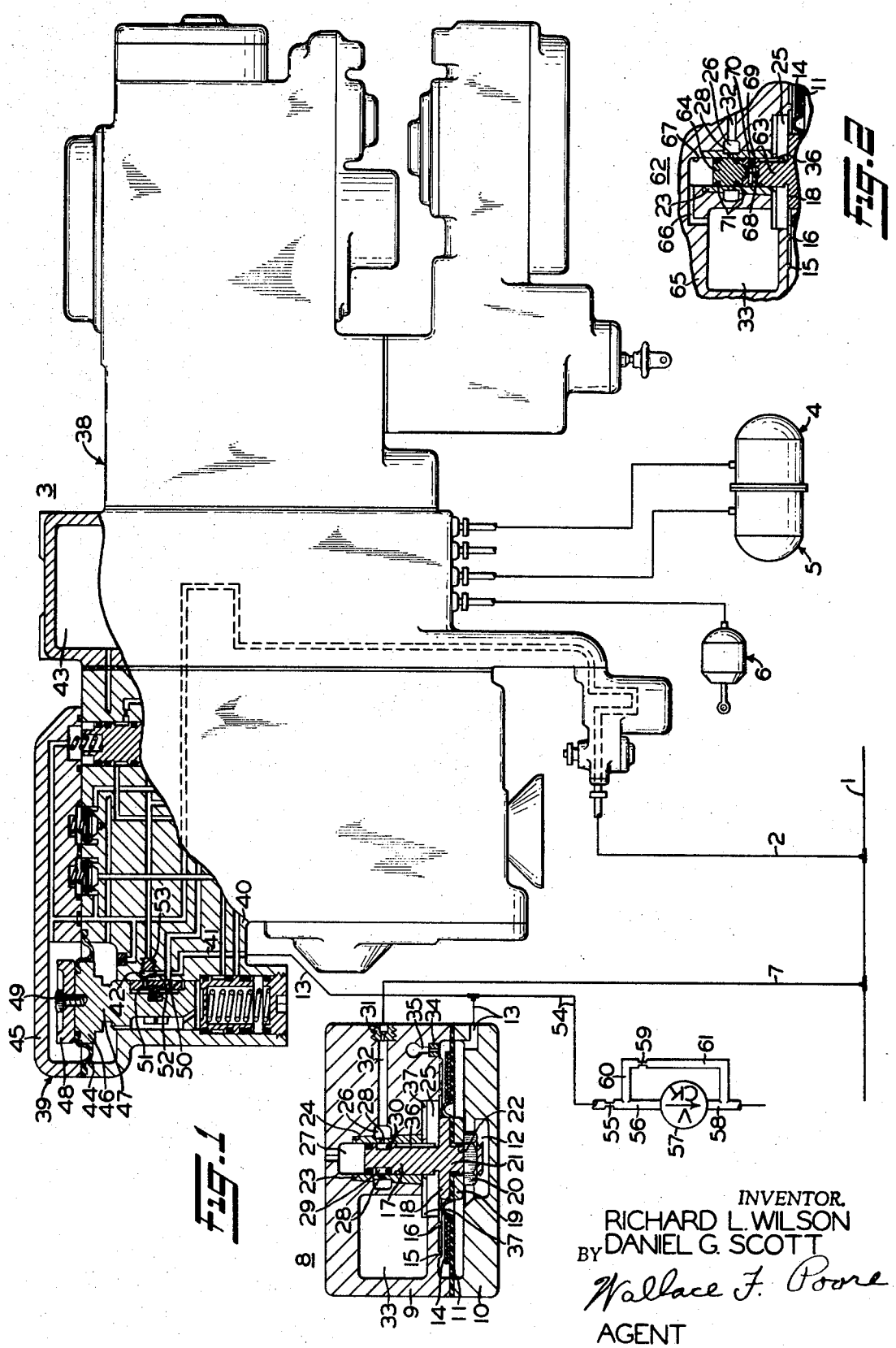

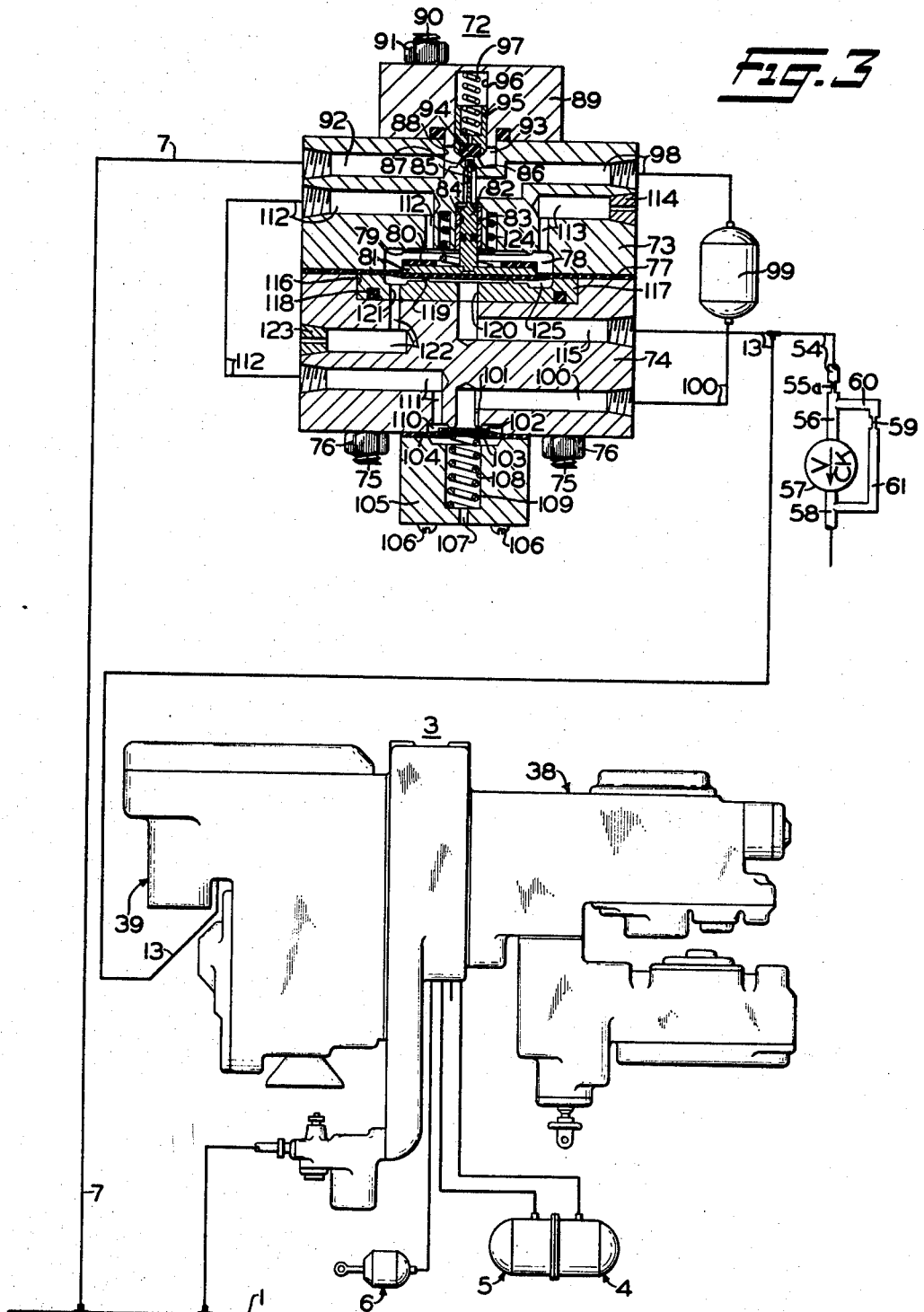

QUICK SERVICE VALVE DEVICE

BACKGROUND OF THE INVENTION

At the time the familiar AB air brake control valve device came into general use on American railroads over 30 years ago, the length of freight cars did not exceed 60 feet. Preset day freight cars that are conventionally equipped with an ABD air brake control valve device, which is an upgraded AB brake control valve device, vary from approximately 30 to 90 feet in length. Since the brake pipe to which the ABD air brake control valve device is connected extends from end to end of the car, it is apparent that the volume of the brake pipe on the longest cars being built today exceeds by at least 50 percent the volume of the brake pipe of older cars. Therefore, it is desirable to effect greater local quick service reductions in brake pipe pressure than has been heretofore possible with the AB freight car brake equipment now in use on most American railroads in order to assure a higher rate of propagation of a brake pipe pressure reduction wave from the locomotive backward through the train and thereby effect a more nearly simultaneous initiation of a service application of brakes on all cars in a train.

Furthermore, the present freight car ABD air brake control valve device is operable to provide a local quick service reduction in brake pipe pressure only in response to the initial reduction in brake pipe pressure effected by manual operation of the engineer's brake valve device located on the locomotive.

Under certain service conditions, for example, when a freight train having cars equipped with the conventional ABD control valve device must descend a long and increasingly steep grade, it is necessary for the engineer to make an initial light reduction in brake pipe pressure and one or more subsequent heavier reductions in order to provide the proper degree of braking on the train as it descends the grade.

Therefore, it would be most desirable that each car in the train be provided, in addition to the conventional ABD control valve device, with an improved quick service valve device for effecting "continual" (that is, interrupted but repeated) limited quick service reductions in brake pipe pressure.

It is the general purpose of this invention to provide a novel quick service valve device for use with an ABD brake control valve device in a railway freight car brake control equipment, which quick service device is operative to effect continual limited quick service reductions in brake pipe pressure, that is, repeated quick service reductions in brake pipe pressure whenever and so long as brake pipe pressure is being reduced at a service rate by manual operation of the engineer's brake valve device on the locomotive. By using a continual quick service valve device with an ABD brake control valve device, greater overall quick service reduction in brake pipe pressure can be effected, without causing an undesired emergency application of brakes, than can be effected with the ABD brake control valve device alone. Also, the local quick service reductions in brake pipe pressure will be effected not only upon an initial service rate of reduction in brake pipe pressure, but also upon successive further service reductions in brake pipe pressure effected to apply brakes to correspondingly greater degrees, such as while descending a grade.

SUMMARY OF THE INVENTION

According to the present invention, a novel continual quick service valve device is provided for use in combination with an ABD brake control valve device. Upon each service rate of reduction in brake pipe pressure, the fluid under pressure released from the quick action chamber in the emergency valve portion of the ABD brake control valve device is supplied to a chamber at one side of a diaphragm that operates a quick service valve and also constitutes a snap-acting valve for controlling flow between a quick service volume and atmosphere. Deflection of the diaphragm in one direction effects opening of the quick service valve and movement of the snap-acting valve into engagement with an annular valve seat to simultaneously close communication between a quick service volume and a restricted exhaust passageway and reduce the effective area of the other side of the diaphragm to that within the annular valve seat and subject to the pressure in the quick service volume. Consequently, when the pressure built up in this volume and on the reduced effective area of the other side of the diaphragm exceeds the pressure acting on the one side thereof by a chosen amount, the deflection of the diaphragm in the opposite direction establishes a restricted communication between the quick service volume and atmosphere and simultaneously restores the effective area of the other side of the diaphragm to its original value, whereupon the above described operation is continually repeated so long as fluid under pressure is present on the one side of the diaphragm. Upon movement of the brake control valve device to its lap position, fluid under pressure is released from the one side of the diaphragm to atmosphere via a check valve and a pair of chokes whereupon the repeated operations of the continual quick service valve device are terminated. However, upon a manually effected subsequent further reduction of pressure in the brake pipe and movement of the brake control valve device to its service position in response thereto, the continual quick service valve device will again operate in the manner described above to repeatedly first vent fluid under pressure from the brake pipe to the quick service volume and thereafter release this fluid under pressure from the quick service volume to atmosphere until the brake control valve device again moves to its lap position.

In the accompanying drawings:

FIG. 1 is a diagrammatic view, partly in section, showing a railway vehicle brake equipment constructed in accordance with one embodiment of the invention and comprising an ABD brake control valve device a novel continual quick service valve device.

FIG. 2 is a partial view, in section, showing a second continual quick service valve device for the brake equipment shown in FIG. 1 constructed in accordance with a second embodiment of the invention.

FIG. 3 is a diagrammatic view, partly in section, showing a railway vehicle brake equipment comprising an ABD brake control valve device and a continual quick service valve device that is constructed in accordance with a third embodiment of the invention.

DESCRIPTION - FIG. 1

The fluid pressure brake equipment shown in FIG. 1 of the drawings comprises a brake pipe 1, a first branch pipe 2, a brake control valve device 3, an auxiliary reservoir 4, an emergency reservoir 5, a brake cylinder 6, a second branch pipe 7 and a continual quick service valve device 8.

The brake control valve device 3 may be of the direct release type, such as the ABD brake control valve device which is described in U.S. Pat. No. 3,175,869, issued Mar. 30, 1965 to Walter B. Kirk and assigned to the assignee of the present application.

In view of the above-mentioned patent, it is deemed unnecessary to show and describe in detail the brake control valve device 3 and the brake cylinder 6. However, part of the emergency portion of the brake control valve device 3 is shown in detail in FIG. 1 of the drawing to illustrate how this emergency portion operates to supply fluid under pressure from a quick action chamber to the continual quick service valve device 8 to control the operation of this valve device. It will, of course, be understood that the brake control valve device 3 operates upon a service reduction in brake pipe pressure to supply fluid under pressure to the brake cylinder 6 to effect a service brake application, upon an emergency reduction in brake pipe pressure to effect an emergency brake application, and upon an increase in brake pipe pressure to effect a complete brake release and the charging of the brake equipment. It will also be understood that the brake cylinder 6 is effective to apply to the wheels of a freight car a braking force proportional to tee pressure of the fluid supplied to the brake cylinder 6 by the brake control valve device 3.

The continual quick service valve device 8 comprises a casing 9 and a cover member 10 secured thereto by any suitable means (not shown), the periphery of an annular flexible diaphragm 11 being clamped therebetween. The diaphragm 11 and the cover member 10 cooperate to form below the diaphragm a chamber 12 into which opens a passageway and corresponding pipe 13. This pipe 13 is connected to the emergency portion of the brake control valve device 3 in a manner hereinafter described.

The upper side of the diaphragm 11 has bonded thereto one side of a metallic plate to the other side of which is bonded a resilient annular valve 14 which, upon the initial upward deflection of the diaphragm 11 in response to the supply of fluid under pressure to the chamber 12, abuts a pair of annular concentric beads or valve seats 15 and 16 that are formed integral with the casing 9.

The diaphragm 11 is operatively connected to a valve stem 17 having adjacent one end a flange 18 between which and a diaphragm follower plate 19 the inner periphery of this diaphragm is clamped by a nut 20 that has screw-threaded engagement with external screw threads formed on a stem 21 that is integral with and extends downward from the flange 18 through a bore 22 formed in the diaphragm follower plate 19.

The valve stem 17 is slidably mounted in a tapered bushing 23 that is press-fitted into a tapered counterbore 24 provided therefor in the casing 9. The bushing 23 extends from a chamber 25 above the diaphragm 11 through a chamber 26 formed in the casing 9 to an atmospheric chamber 27 also in this casing and is provided with a plurality of arcuately arranged ports 28, two of which appear in FIG. 1, that at one end open into the chamber 26 and at the other end, while the valve stem 17 occupies the position shown, open intermediate the ends of an elongated peripheral annular groove 29 provided on this stem 17 intermediate the ends thereof. An O-ring seal 30 is reciprocable within and relative to the groove 29 so as to serve as a valve in the manner hereinafter explained to control communication between the chamber 26, into which the branch pipe 7 opens via a choke 31 and a passageway 32, and the chamber 25.

The chamber 25 is in constant communication with a quick service volume 33 formed in the casing 9 and, while the annular valve 14 is unseated from the beads 15 and 16, is open to atmosphere via an exhaust choke 34 and a passageway 35 that extends through the casing 9 and opens at the exterior thereof.

The valve stem 17 is provided with a slot or groove 36 that is located thereon just below the elongated peripheral annular groove 29 and at its lower end opens into the chamber 25 into which extends a plurality of arcuately spaced stop ribs 37, two of which appear in FIG. 1 of the drawing, that are integral with the casing 9. These ribs 37 serve to limit the upward movement of the valve stem 17 and the flange 18 integral therewith.

The brake control valve device 3 comprises a service portion 38 and an emergency portion 39 which are the same in construction and operation as the service and emergency portions of the hereinbefore-mentioned ABD brake control valve device except the emergency portion 39 is modified in a manner now to be explained.

The emergency portion 39 comprises a body 40 that is identical to the body of the emergency portion of the ABD brake control valve device except that it is provided with an additional passageway 41 that at one end opens at the exterior of the body 40. One end of the hereinbefore-mentioned pipe 13 is connected to this one end of the passageway 41 which extends through the body 40 and at its opposite end opens into a chamber 42 provided in this body 40.

The chamber 42 is identical to a chamber provided in the emergency portion of the ABD brake control valve device. This chamber in the body of the emergency portion of the ABD brake control valve device is open to atmosphere via a passageway having therein a choke.

The brake control valve device 3 is provided with a quick action chamber 43 and the outer periphery of an annular diaphragm 44 is clamped between the upper end of the body 40 of the emergency portion 39 of the brake control valve 3 and a cover member 45 secured to the body 40 by any suitable means (not shown). The inner periphery of the diaphragm 44 is clamped between a diaphragm follower 46 that is integral with an emergency valve stem 47 and a diaphragm follower plate 48 by a cap screw 49 that extends through a smooth bore in the diaphragm follower plate 48 and has screw-threaded engagement with a screw-threaded bottomed bore in the emergency valve stem 47. This valve stem 47 is provided with a recess in which is received an emergency graduating valve 50. The above described construction of the emergency portion 39 is identical to that of the emergency portion of the aforementioned ABD brake control valve device. Furthermore, the upper side of the diaphragm 44 is subject to the pressure in the brake pipe 1 and the lower side is subject to the pressure in the quick action chamber 43 as is the diaphragm in the emergency portion of the ABD brake control valve device.

In both the ABD brake control valve device and the brake control valve device 3, when the pressure in the train brake pipe is reduced at a service rate, fluid under pressure is released from the upper side of the diaphragm 44 at a service rate to cause the fluid under pressure present in the quick action chamber 43 and effective on the lower side of the diaphragm 44 to deflect this diaphragm upward. This upward deflection of the diaphragm 44 moves the emergency valve stem 47 and emergency graduating valve 50 upward to the position shown in FIG. 1. In this position of the emergency graduating valve 50, fluid under pressure can flow from the quick action chamber 43 and the lower side of the diaphragm 44 through a port 51 in the graduating valve 50 and a port 52 in the graduating valve seat to the hereinbefore-mentioned chamber 42.

As stated above, this chamber 42 in the body of the emergency portion of the standard ABD brake control valve device is open to atmosphere via a passageway and a choke disposed in this passageway. In the body 40 of the emergency portion 39 shown in FIG. 1, this choke is replaced by a screw-threaded plug 53. Therefore, the fluid under pressure that is supplied from the quick action chamber 43 to the chamber 42, while the emergency graduating valve 50 occupies the position shown in FIG. 1, will flow from the chamber 42 in the body 40 of the emergency portion 39 to the chamber 12 in the quick service valve device 8 via the passageway 41 and the pipe and passageway 13 to cause operation of this valve device 8 in a manner hereinafter described.

In order to release fluid under pressure from the chamber 12 in the quick service valve device 8 to atmosphere, one end of a pipe 54 is connected to the pipe 13 intermediate the ends thereof. The opposite end of this pipe 54 is connected to the inlet side of a choke 55. It should be noted that the size of this choke 55 must be the same as the choke used in the emergency valve body of the emergency portion of the ABD brake control valve device and replaced by the screw-threaded plug 53 in the body 40 of the emergency portion 39 of the brake control valve device 3. Since the size of the choke 55 is selected to be the same as that of the choke used in the emergency valve body of the emergency portion of the standard ABD brake control valve device, fluid under pressure can be released from the quick action chamber 43 and the lower side of the diaphragm 44 via this choke 55 at the same rate as fluid under pressure is released from the quick action chamber and the lower side of the diaphragm of the emergency portion of the standard ABD valve device to prevent the emergency portion 39 of the brake control valve device 3 from effecting an emergency brake application.

The outlet side of the above-mentioned choke 55 is connected by a short pipe 56 to the inlet side of a spring-loaded one-way flow check valve 57, it being noted that the spring used to load the check valve 57 is a very light spring. The outlet of the check valve 57 is open to atmosphere via a pipe 58.

In order to prevent the check valve 57 from retaining any pressure in the chamber 12 of the quick service valve device 8 or interfering with the required operation of the emergency portion 39 of the brake control valve device 3, a choke 59 is connected in by-passing relation to the check valve 57 by having its inlet connected by a pipe 60 to the pipe 56 and its outlet connected by a pipe 61 to the pipe 58.

The size of the choke 59 is less than that of the choke 55. However, this choke 59 must be of sufficient size to permit any leakage of fluid under pressure that may occur between the emergency graduating valve 50 and its seat into the chamber 42, which is connected to the chamber 12 in the quick service valve device 8 via passageway 41 and pipe and passageway 13, to escape from this chamber 42 to atmosphere via this choke 59 without building up the pressure in the chamber 12 sufficiently to cause an undesired operation of the quick service valve device 8.

OPERATION - FIG. 1

INITIAL CHARGING

Let it be assumed that a railway freight car provided with the brake control valve device 3 and the continual quick service valve device 8, shown in FIG. 1 of the drawings, has been coupled into a train of cars, and that a handle of an engineer's brake valve device (not shown) located on the locomotive coupled to the head end of the train is in its release position. Therefore, while the handle of the engineer's brake valve device is in its release position, the engineer's brake valve device will effect the supply of fluid under pressure to the train brake pipe and therefore to the brake pipe 1 to charge the brake pipe to a preselected normal charged value which, for example, may be 70 pounds per square inch.

Fluid under pressure supplied to the brake pipe 1 will flow via the branch pipe 2 to the brake control valve device 3 to cause it to operate in the usual well-known manner of the ABD brake control valve device to effect a release of the brakes on the car and to charge the auxiliary reservoir 4 and the emergency reservoir 5 to the pressure carried in the brake pipe 1.

Fluid under pressure supplied to the brake pipe 1 will flow therefrom to the chamber 26 in the quick service valve device 8 via the branch pipe 7, choke 31, and passageway 32 to charge the chamber 26 to the hereinbefore-mentioned preselected normal charged value. Assuming that the O-ring seal 30 is disposed at the lower end of the elongated groove 29, fluid under pressure will flow from the chamber 26 through the ports 28 in the bushing 23 to act on the top of the O-ring seal 30 to maintain it in the position shown.

At this time the chamber 12 in the quick service valve device 8 is open to atmosphere via passageway and pipe 13, pipe 54, choke 55, pipe 56, check valve 57 and pipe 58, and also via pipe 60, choke 59, and pipe 61 that provide a by-pass around the check valve 57 so that no fluid under pressure is retained in the chamber 12.

With fluid under pressure thus completely vented from chamber 12, the diaphragm 11 and the annular valve 14 will occupy the position shown in FIG. 1 in which the annular valve 14 is unseated from the two concentric annular valve seats 15 and 16. Consequently, the quick service volume 33 is open to atmosphere via the chamber 25, choke 34 and passageway 35 so that atmospheric pressure is present in the quick service volume 33.

FULL SERVICE APPLICATION OF BRAKES

Assume that the brake equipment shown in FIG. 1 of the drawings is the brake equipment on a freight car in a train of cars being hauled by a locomotive, and let it be supposed that the engineer desires to effect a full service brake application on the train.

To manually effect a full service brake application on a train, the engineer will move the handle of the engineer's brake valve device on the locomotive arcuately from its release position to its full service position in a service zone.

When the handle of the brake valve device is moved to its full service position in the service zone, the brake valve device operates to vent fluid under pressure from the brake pipe 1 to atmosphere at a service rate until the pressure in the brake pipe 1 is reduced to a corresponding degree.

As the pressure in the brake pipe 1 is reduced at a service rate, the service portion 38 of the brake control valve device 3 operates in the usual well-known manner to effect an initial quick service reduction in brake pipe pressure and a full service brake application on the freight car on which brake control valve device 3 is installed. Also, as the pressure in the brake pipe 1 is reduced by flow therefrom to atmosphere via the branch pipe 2, brake pipe 1 and the engineer's brake valve device on the locomotive, fluid under pressure will flow from the upper side of the diaphragm 44 in the emergency portion 39 of the brake control valve device 3 since the upper side of this diaphragm 44 is subject to brake pipe pressure as is the upper side of the diaphragm in the emergency portion of the ABD valve device. Consequently, as brake pipe pressure acting on the upper side of the diaphragm 44 is reduced, the fluid under pressure present in the quick action chamber 43 and acting on the lower side of this diaphragm 44 will deflect this diaphragm upward to move the emergency valve stem 47 and the emergency graduating valve 50 to the position in which they are shown in FIG. 1.

While the emergency graduating valve 50 occupies the position shown in FIG. 1, fluid under pressure flows from the quick action chamber 43 through the port 51 in this graduating valve 50 and the port 52 in the valve seat to the chamber 42 in the body 40 of the emergency portion 39 and thence to the chamber 12 in the quick service valve device 8 via passageway 41 and pipe and passageway 13. It will be noted that the pipe 13 is open to atmosphere via pipe 54, choke 55, check valve 57 and pipe 58 and also via the choke 59 which is connected in parallel relation to the check valve 57. These chokes 55 and 59 and the check valve 57 sufficiently restrict the flow of fluid under pressure from the pipe 13 to atmosphere to cause a buildup of pressure in the chamber 12 of the quick service valve device 8. However, it should be remembered that fluid under pressure from the lower side of diaphragm 44 and the quick action chamber 43 is released to atmosphere via the chokes 55 and 59 and the check valve 57 at the same rate as fluid under pressure is released from the upper side of diaphragm 44. Consequently, the emergency graduating valve 50 remains in the position shown in FIG. 1 and is not moved to its emergency position to cause an undesired emergency brake application.

As the fluid under pressure supplied to the chamber 12 in the quick service valve device 8 increases the pressure therein, it acts over the entire effective area of the lower side of the diaphragm 11 to simultaneously move the annular valve 14 and the valve stem 17 upward until the annular valve 14 is moved into seating contact with the concentric annular valve seats 15 and 16. This movement of the annular valve 14 into seating contact with the concentric annular valve seats 15 and 16 closes communication between the quick service volume 33 and atmosphere via the exhaust choke 34 and passageway 35.

Subsequent to movement of the annular valve 14 into seating contact with the concentric annular valve seats 15 and 16, the continuing buildup of pressure in the chamber 12 acts over the effective area of the lower side of the diaphragm 11 within the annular valve seat 16, it being noted that this effective area may be, for example, one half of the entire effective area of the lower side of the diaphragm 11. This continued buildup of pressure within the chamber 12 and acting on the reduced effective area of the diaphragm 11 will deflect this portion of the diaphragm 11 upward to move the valve stem 17 and flange 18 integral therewith upward until this flange 18 abuts the stop ribs 37.

As the valve stem 17 is moved upward in the manner described above, the O-ring seal 30 carried in the lower end of the elongated peripheral annular groove 29 will be moved upward past the plurality of parts 28 in the bushing 23. When the O-ring seal 30 is moved upward past these ports 28, the fluid under pressure supplied to the chamber 26 from the brake pipe 1 will flow through the ports 28 and move this O-ring seal 30 to the upper end of the elongated groove 29. Fluid under pressure will now flow from the brake pipe 1 to the quick service volume 23 via the branch pipe 7, choke 31, passageway 32, chamber 26, ports 28, grooves 29 and 36 and chamber 25.

The fluid under pressure thus supplied to the chamber 25 and the quick service volume 33 acts on the upper side of that portion of the diaphragm 11 within the annular valve seat 16, it being remembered that the effective area of this portion of the diaphragm within the annular valve seat 16 may be, for example, substantially one half the effective area of the lower side of the diaphragm 11 which is subject to the pressure in the chamber 12. Consequently, fluid under pressure will flow from the brake pipe 1 to the chamber 25 and the quick service volume 33 until the pressure therein is, for example, substantially twice the pressure in the chamber 12.

When the pressure in the chamber 25 and the quick service volume 33 is, for example, substantially twice or slightly in excess of twice the pressure in the chamber 12, the resulting fluid pressure force acting in a downward direction on the effective area of that portion of the diaphragm 11 within the annular valve seat 16 will deflect this portion of the diaphragm downward to effect unseating of the annular valve 14 from the two concentric annular valve seats 15 and 16.

It may be noted that since the O-ring seal 30 at this time occupies a position at the upper end of the groove 29, as aforestated, the communication between the chamber 26 and the quick service volume 33 remains open via ports 28, that portion of the groove 29 below the O-ring seal 30, groove 36 and chamber 25, as that portion of the diaphragm 11 within the valve seat 16 is deflected downward to move the valve stem 17 and O-ring seal 30 downward therewith until the annular valve 14 is unseated from the concentric annular valve seats 15 and 16.

As soon as the annular valve 14 is unseated from the valve seats 15 and 16, the fluid under pressure in the chamber 25 and the quick service volume 33 acts over the effective area of the entire upper side of the diaphragm 11. Since the pressure in the chamber 25 ag the quick service volume 33 is higher than the pressure in the chamber 12 because fluid under pressure is flowing from the chamber 12 to atmosphere at a restricted rate via passageway and pipe 13, pipe 54, choke 55, check valve 57 and pipe 58, and also choke 59, it is apparent that this higher pressure acting over the effective area of the entire upper side of the diaphragm 11 deflects this diaphragm 11 and the annular valve 14 downward with a snap action. This downward deflection of the diaphragm 11 is effective to move the stem 17 and O-ring seal 30, now at the upper end of the groove 29, downward until this O-ring seal 30 is moved below the ports 28. When the O-ring seal 30 is thus moved below the ports 28, fluid under pressure supplied from the brake pipe 1 to the chamber 26, via the path hereinbefore described, flows through the ports 28 and acts on the upper side of the O-ring seal 30 to move it from the upper end of the groove 29 to the lower end of this groove. When the O-ring seal 30 is thus moved downward to a position below the ports 28 and then to the lower end of the groove 29, it will form a seal with the wall surface of the bushing 23 to prevent further flow of fluid under pressure from the chamber 26 to the quick service volume 33.

Moreover, as soon as the annular valve 14 is unseated from the valve seats 15 and 16, fluid under pressure is released from the quick service volume 33 to atmosphere via chamber 25, choke 34 and passageway 35 at a rate controlled by the size of the choke 34. It will be noted that, since the annular valve 14 is now unseated from the annular valve seats 15 and 16, the fluid under pressure acting on the effective area of the entire upper side of the diaphragm 11 is released to atmosphere via the choke 34 and passageway 35 simultaneously as the fluid under pressure in the quick service volume 33 is released to atmosphere. Therefore, the fluid pressure force acting on the effective area of the entire upper side of the diaphragm 11 is quickly reduced to such a value that the fluid under pressure flowing to the chamber 12 from the quick action chamber 43, assuming that the brake control valve device 3 has not moved to lap position, is able to establish a fluid pressure force that acts in an upward direction on the effective area of the lower side of the diaphragm 11 that is in excess of the reducing fluid pressure force acting on the effective area of the entire upper side of this diaphragm.

Consequently, this greater fluid pressure force acting in an upward direction on the diaphragm 11 will first deflect this diaphragm upward until the annular valve 14 is seated on the concentric annular valve seats 15 and 16 to thereby close communication between the quick service volume 33 and atmosphere.

Subsequent to this seating of the annular valve 14 on the concentric valve seats 15 and 16, the fluid under pressure being supplied from the quick action chamber 43 to the chamber 12 acts on the effective area of the lower side of the diaphragm 11 and within the annular valve seat 16 to deflect this portion of the diaphragm 11 upward to move the valve stem 17 and the O-ring seal 30 that now occupies a position at the lower end of the groove 29 upward until this O-ring seal 30 is moved to a position above the ports 28 in the bushing 23.

When the O-ring seal 30 is thus moved to a position above the ports 28, the fluid under pressure supplied to the chamber 26 from the brake pipe 1 flows through the ports 28 and acts on the lower side of the O-ring seal 30 to move it to the upper end of the groove 29.

Moreover, the above-mentioned upward deflection of that portion of the diaphragm 16 within the annular valve seat 11 continues until the flange 18 on the stem 17 abuts the stop ribs 37. In this position of the stem 17 and the O-ring seal 30, which is now at the upper end of the groove 29, fluid under pressure supplied from the brake pipe 1 to the chamber 26 will flow to the quick service volume 33 via ports 28, that portion of the groove 29 below the O-ring seal 30, groove 36 and chamber 25.

This supply of fluid under pressure from the brake pipe 1 to the quick service volume 33 will cause the quick service valve device 8 to operate in the manner hereinbefore described to first vent fluid under pressure from the brake pipe 1 to the quick service volume 33 and then release this fluid under pressure to atmosphere via the choke 34 and passageway 35.

It is apparent from the foregoing description of operation of the continual quick service valve device 8 that this valve device will operate to repeatedly supply fluid under pressure from the brake pipe 1 to the quick service volume 33 and then release this fluid under pressure to atmosphere so long as the control valve device 3 remains in its service position so that the emergency graduating valve 50 and the valve stem 47 in the emergency portion 39 of this control valve device 3 occupy the position shown in FIG. 1 of the drawings. This repeated supply of fluid under pressure from the brake pipe 1 to the quick service chamber 33 is effective to cause a local quick service venting of fluid under pressure from the brake pipe 1 to atmosphere and a reduction of the pressure in the train brake pipe to effect "quick service" transmission through the train brake pipe of a pressure reduction wave.

When the pressure in the train brake pipe has been reduced to the value corresponding to a full service brake application, fluid under pressure will no longer be released from the train brake pipe via the engineer's brake valve device on the locomotive. Consequently, the brake control valve device 3, and likewise the brake control valve device on each car in the train, will move from its service position to its lap position.

Upon cessation of the release at a service rate of fluid under pressure from the train brake pipe and therefore the upper side of the diaphragm 44 of the emergency portion 39 of the brake control valve device 3, the flow of fluid under pressure from the quick action chamber 43 and the lower side of the diaphragm 44 to atmosphere via port 51 in the emergency graduating valve 50, port 52 in the seat of this graduating valve, passageway 41, pipes 13 and 54, choke 55, pipe 56, check valve 57 and pipe 58 will quickly reduce the pressure acting on the lower side of the diaphragm 44 below that acting on the upper side, whereupon this diaphragm will be deflected downward to move the valve stem 47 and emergency graduating valve 50 downward from their service position in which they are shown in FIG. 1 to their service lap position in which the port 51 in the valve 50 no longer registers with the port 52 in the seat of this valve, thus cutting off flow of fluid under pressure from the quick action chamber 43 to the chamber 12 in the quick service valve device 8.

When the supply of fluid under pressure to the chamber 12 is thus terminated, the fluid under pressure remaining in this chamber will flow to atmosphere via passageway and pipe 13, pipe 54, choke 55, pipe 56, check valve 57, and pipe 58 until this pressure is reduced to such a value that the check valve 57 is seated. Subsequent to the seating of check valve 57, the fluid under pressure remaining in the chamber 12 will flow to atmosphere via the choke 59 which is connected in by-passing relation to the check valve 57.

When the supply of fluid under pressure to the chamber 12 is terminated and the fluid under pressure in this chamber vented in the manner described above, the continual quick service valve device 8 will cease to operate to repeatedly vent fluid under pressure from the brake pipe 1 to the quick service volume 33 and thereafter vent this fluid under pressure from the volume 33 to atmosphere in the manner described above.

RELEASE OF A FULL SERVICE APPLICATION OF BRAKES

To effect a release of a full service application of brakes, the engineer will move the handle of the brake valve device on the locomotive from its full service position back to its release position whereupon this valve device will effect the supply of fluid under pressure to the train brake pipe and therefore to the brake pipe 1 to charge the train brake pipe to the hereinbefore-mentioned preselected normal charged value.

The fluid under pressure thus supplied to the brake pipe 1 will cause the brake control valve device 3 to effect a release of the brakes in the usual well-known manner.

INITIAL PARTIAL SERVICE APPLICATION OF BRAKES

To manually effect an initial partial service application of brakes on a train, the engineer will move the handle of the engineer's brake valve device on the locomotive arcuately from its release position into its service zone to a position corresponding to the degree of initial service application desired. When the handle is moved to the desired position in its service zone, the brake valve device operates to vent fluid under pressure from the train brake pipe to atmosphere until the pressure in the train brake pipe is reduced a corresponding degree.

As the pressure in the brake pipe 1 is reduced, the brake control valve device 3 operates in the usual well-known manner to effect an initial quick service reduction in brake pipe pressure and an initial partial service brake application on the freight car on which the brake control valve 3 is installed, the degree of the partial service brake application corresponding to the degree of reduction of pressure effected in the brake pipe 1.

When the brake control valve device 3 is moved to its service position, the emergency portion 39 thereof operates in the manner hereinbefore described to effect the supply of fluid under pressure from the quick action chamber 43 to the chamber 12 in the quick service valve device 8 until the brake control valve device 3 moves to its lap position.

So long as fluid under pressure is supplied from the quick action chamber 43 to the chamber 12, the continual quick service valve device 8 will operate repeatedly in the manner hereinbefore described to effect the supply of fluid under pressure from the brake pipe 1 to the quick service volume 33 and thereafter vent this fluid under pressure from this volume 33 to atmosphere.

SUPPLEMENTAL SERVICE APPLICATION OF BRAKES

Let it be supposed that subsequent to effecting an initial partial service application of brakes on the train, the engineer desires to effect a supplemental service brake application to increase the degree of the service brake application. To do so, he will move the handle of the engineer's brake valve device arcuately from the position it occupies in its service zone in a direction away from its release position to another position in this zone corresponding to the degree of service brake application now desired on the train. When the handle is thus moved from the one position to another in the service zone, the brake valve device operates to again vent fluid under pressure from the brake pipe 1 to atmosphere until the pressure therein is reduced a corresponding degree.

As the pressure in the brake pipe 1 is thus further reduced, the brake control valve device 3 operates in the usual well-known manner from its lap position to its service position whereupon the emergency portion 39 will again operate to effect the supply of fluid under pressure from the quick action chamber 43 to the chamber 12 in the quick service valve device 8 until the brake control valve device 3 again moves to its lap position.

The continual quick service valve device 8 will operate in response to this fluid under pressure supplied to its chamber 12 in the same manner as hereinbefore described to repeatedly effect the supply of fluid under pressure from the brake pipe 1 to the quick service volume 33 and thereafter vent this fluid under pressure to atmosphere.

DESCRIPTION - FIG. 2

FIG. 2 of the drawings shows a partial view of a continual quick service valve device 62 constituting a second embodiment of the invention. Quick service valve device 62 is identical in construction to the quick service valve device 8 except the valve stem 17 having thereon the groove 29 and the O-ring seal 30 carried in the groove 29 is replaced by a valve stem 63 which has a lostemotion connection with a cylindrical valve member 64 that is slidably and sealably mounted in the bushing 23, and a different casing 65 is provided that has formed therein a passageway 66 that at one end opens into the quick service volume 33 and at the other opens into a bottomed bore 67 in this casing, it being noted that this bottomed bore 67 is coaxial with the bushing 23.

Since the continual quick service valve devices 8 and 62 shown respectively in FIGS. 1 and 2 are identical in construction, except as pointed out above and hereinafter described in detail, for convenience, only that portion of the valve device 62 that is different in construction from the valve device 8 is shown in FIG. 2, and corresponding parts of the two quick service valve devices are identified by the same reference numerals without additional description.

The above-mentioned lost-motion connection between the valve stem 63 and the valve member 64 is constituted by the lower end of the valve member 64, which is of reduced diameter, being disposed in a bottomed bore 68 formed in the stem 63 and connected thereto by a pin 69 extending through a bore 70 of larger diameter than the pin 69 which bore 70 is formed in the portion of reduced diameter at the lower end of the valve member 64, the pin 69 having its opposite ends anchored in the stem 63.

The cylindrical valve member 64 is provided with a pair of spaced-apart peripheral annular grooves in each of which is disposed an O-ring seal 71. While the valve member 64 occupies the position in which it is shown in FIG. 2, the two O-ring seals 71 respectively form a seal with the wall surface of the bushing 23 above and below the ports 28 in this bushing to prevent the flow of fluid under pressure from the chamber 26 to the bottomed bore 67 and to the chamber 25.

It will be noted that the passageway 66 provides for always subjecting the opposite ends of the cylindrical valve member 64 to the pressure in the quick service volume 33 so that this valve member is balanced. Consequently, the force required to move this valve member 64 is only that required to overcome the friction between the two O-rings 71 and the wall surface of the bushing 23.

OPERATION - FIG. 2

In operation, when fluid under pressure is supplied from the quick action chamber 43 to the chamber 12 below the diaphragm 11 in the same manner as hereinbefore described for the first embodiment of the invention, the diaphragm 11 will be deflected upward to move the annular valve 14 and the valve stem 63 upward until this valve 14 is moved into seating contact with valve seats 15 and 16, it being noted that valve 14 is moved into seating contact with the valve seats 15 and 16 before the lower O-ring seal 71 carried by the valve member 64 is moved to a position above the ports 28. Consequently, the communication between the quick service volume 33 and atmosphere is closed prior to effecting the supply of fluid under pressure from the brake pipe 1 to the quick service volume 33.

As in the first embodiment of the invention, subsequent to movement of the annular valve 14 into seating contact with the concentric annular valve seats 15 and 16, the continuing buildup of pressure in the chamber 12 and acting over the effective area of the lower side of the diaphragm 11 within the annular valve seat 16 will deflect this portion of the diaphragm 11 upward to move the valve stem 63, flange 18 and valve member 64 upward from the position shown in FIG. 2 until this flange 18 abuts the stop ribs 37.

When the flange 18 abuts the ribs 37, the lower O-ring seal 71 carried by valve member 64 will form a seal with the wall surface of the bushing 23 at a location above the ports 28 in this bushing.

Accordingly, when this lower O-ring seal 71 carried by valve member 64 is moved to a position above the ports 28 in the bushing 23, fluid under pressure will flow from the chamber 26, which is connected to the brake pipe 1 as in the first embodiment of the invention, to the quick service volume 33 via ports 28, the interior of the bushing 23 below the lower O-ring seal 71, the groove 36 on stem 63 and chamber 25.

This supply of fluid under pressure to the chamber 25 and quick service volume 33 will increase the pressure therein until, as in the first embodiment of the invention, the resulting fluid pressure force acting in a downward direction on the effective area of that portion of the diaphragm 11 within the annular valve seat 16 deflects this portion of the diaphragm 11 downward. As this portion of the diaphragm 11 is thus deflected downward, the valve stem 63 and pin 69 are moved downward therewith.

It will be remembered that the lower O-ring seal 71 carried by the valve member 64 at this time occupies a position in which it forms a seal with the wall of the bushing 23 at a location above the ports 28 in this bushing, so that the communication between the chamber 26 and the quick service volume 33 is open. Furthermore, it will be remembered that the diameter of the bore 70 is greater than the diameter of the pin 69. Therefore, the communication between the chamber 26 and the quick service volume 33 remains open as that portion of the diaphragm 11 within the valve seat 16 is deflected downward to move the valve stem 63 downward. The diameter of the bore 70 is sufficiently larger than the diameter of the pin 69 to permit sufficient downward deflection of that portion of the diaphragm 11 within the valve seat 16 to unseat the valve 14 from the annular valve seats 15 and 16 before the valve member 64 is moved from the position in which the lower O-ring seal 71 carried thereby forms a seal with the wall surface of the bushing 23 at a location above the ports 28 in this bushing.

As soon as the valve 14 is unseated from the valve seats 15 and 16, the fluid under pressure in the chamber 25 and quick service volume 33 acts over the effective area of the entire upper side of the diaphragm 11 whereupon, as in the first embodiment of the invention, this diaphragm 11, annular valve 14 and stem 63 are deflected downward with a snap action.

As the stem 63 is thus moved downward, as soon as pin 69, which has its opposite ends anchored in this stem, contacts the wall surface of the bore 70, this pin 69 is effective to move the valve member 64 downward with the stme 63 so that the lower O-ring seal 71 carried by member 64 is moved downward to a position in which it forms a seal with the wall surface of the bushing 23 at a location below the ports 28 in this bushing thereby terminating flow of fluid under pressure from the brake pipe 1 to the quick service volume 33.

Except as noted above, the construction and operation of the continual quick service valve device 62 is the same as that of the continual quick service valve device 8. Consequently, the quick service valve device 62 will operate to repeatedly first supply fluid under pressure from the brake pipe 1 to the quick service volume 33 therein and then release this fluid under pressure to atmosphere so long as the control valve device 3 remains in its service position.

DESCRIPTION - FIG. 3

In FIG. 3 of the drawings, there is shown a fluid pressure brake equipment that is the same as the brake equipment shown in FIG. 1 except the continual quick service valve device 8 shown in FIG. 1 is replaced by a continual quick service valve device 72 which is constructed in accordance with a third embodiment of the invention. The continual quick service value device 72 comprises a pair of casing sections 73 and 74 secured together by a pair of stud bolts 75 and nuts 76, the periphery of an annular, flat, flexible, diaphragm 77 being clamped therebetween.

As shown in FIG. 3, the lower side of the casing section 73 is provided with an inverted cup-shaped cavity 78, the upper wall of which has formed thereon an annular bead that constitutes a valve seat 79 for an annular valve 80 that is constructed of some flexible material such as, for example, rubber. The lower side of the annular valve 80 is secured, as by bonding, to the upper side of a metallic disc 81, the lower side of which is secured, as by bonding, to the upper side of the diaphragm 77.

The larger end of a cylindrical valve stem 82 having two portions of unequal diameter may abut or be secured, as by a press fit, to the upper side of the disc 81, that portion of larger diameter being slidably and sealably mounted in a wear bushing 83 that is press-fitted into a counterbore 84 provided therefor in the casing sections 73. This counterbore 84 is coaxial with a second counterbore 85 and a bore 86 in the casing section 73. The bore 86 has formed at the upper end thereof an annular valve seat 87 that projects into a counterbore 88 that extends downward from the top of the casing section 73 and is coaxial with the bore 86. The upper end of the counterbore 88 is closed by a cover member 89 that is secured to the top of the casing section 73 as by a plurality of stud bolts 90 and nuts 91 only one of which appears in FIG. 3.

The casing section 73 is provided with a first passageway 92, one end of which opens at the wall surface of the counterbore 88. Connected to the opposite end of this passageway 92 is one end of the branch pipe 7 which, as in the first embodiment of the invention, is connected to the brake pipe 1. The cover member 89 together with the wall surface of the counterbore 88 cooperate to form a chamber 93 in which is disposed a flat, resilient disc valve 94 that is carried in the lower end of a cup-shaped piston 95 that is slidably mounted in a bottomed bore 96 provided in the cover member 89. A spring 97 is interposed between the cup-shaped piston 95 and the upper end of the bottomed bore 96 to normally yieldingly bias the valve 94 into contact with the valve seat 87.

Opening at the wall surface of the counterbore 85 a short distance below the lower end of the coaxial bore 86 is one end of a passageway 98 that extends through the casing section 73 to the exterior thereof and is connected by a correspondingly numbered pipe to one end of a reservoir 99 that constitutes a quick service volume corresponding to the quick service volume 33 in the quick service valve device 8. Connected to the other end of this reservoir 99 is one end of a pipe 100 that is connected to a correspondingly numbered passageway that is provided in the casing section 74 and has an annular valve seat 101 formed at the end thereof.

One side of a flat resilient check valve 102 is adapted to engage the annular valve seat 101 and the other side of this valve is secured, as by bonding, to the upper side of a flat metallic plate 103 that has its lower side secured, as by bonding, to the upper side of a flat resilient diaphragm 104. The outer periphery of the diaphragm 104 is clamped between the lower side of the casing section 74 and a lower cover 105 that is secured to the lower end of the casing section 74 by a plurality of screws 106 two of which appear in FIG. 3.

The lower cover 105 is provided with a bore 107 and a coaxial counterbore 108 that are coaxial with the annular valve seat 101.

Disposed in the counterbore 108 and interposed between the lower end thereof and the lower side of the diaphragm 104 is a spring 109 that is normally effective to bias the check valve 102 against the annular valve seat 101 to close communication between the passageway 100 and an annular chamber 110 that is formed by the cooperative relationship of the diaphragm 104 and the casing section 74 and is disposed in surrounding relation to the annular valve seat 101.

Opening into the chamber 110 is one end of a passageway 111 that extends through the casing section 74 and has its other end open to the exterior thereof. Connected to this exterior end of the passageway 111 is one end of a pipe 112 that has its opposite end connected to a correspondingly numbered passageway that extends through the casing section 73 and opens into cavity 78 in this casing section within the annular valve seat 79. Also opening into the cavity 78 and on the outside of the annular valve seat 79 is one end of a passageway 113 that extends through the casing section 73 to the exterior thereof. A choke 114 is disposed in the exterior end of the passageway 113 to restrict the rate of flow of fluid under pressure from this passageway to atmosphere for a purpose hereinafter made apparent.

As shown in FIG. 3 of the drawings, the casing section 74 is provided with a passageway 115 that at one end opens into a bottomed bore 116 provided in the upper end of this casing section. The other end of this passageway 115 opens at the exterior of the casing section 74 and has one end of the hereinbefore-mentioned pipe 13 connected thereto. It will be understood that the other end of this pipe 13 is connected to the passageway 41 (FIG. 1) in the emergency portion 39 of the brake control valve device 3, as shown in FIG. 1.

Disposed in the bottom bore 116 (FIG. 3) is a shallow cup-shaped member 117, the bottom of which is provided with an annular groove in which is disposed an O-ring seal 118 that forms a seal with the bottom of the bottomed bore 116. The upper side of the cup-shaped member 117 is provided with an annular valve seat 119, the diameter of which is less than the diameter of the hereinbefore-mentioned annular valve seat 79. Coaxial with and disposed with the annular valve seat 119 is a bore 120 that extends through the member 117. This bore 120 at its lower end registers with the hereinbefore-mentioned one end of the passageway 115. The member 117 is further provided with a second bore 121 that at its upper end, as shown in FIG. 3, opens at the outside of the annular valve seat 119. The lower end of the bore 121 registers with one end of a passageway 122 that extends through the casing section 74 to the exterior thereof and has a choke 123 therein to restrict the rate of flow of fluid under pressure from this passageway to atmosphere for a purpose hereinafter made apparent.

It will be noted from FIG. 3 that the pipe 13 is connected to the inlet of a choke 55a by the pipe 54. The size of the choke 55a is less than that of the choke 55 shown in FIG. 1 for a reason hereinafter made apparent. Consequently, the lower side of the diaphragm 77 within the annular valve seat 119 is always open to atmosphere via bore 120, passageway 115, pipes 13 and 54, choke 55a, pipe 56, check valve 57 and pipe 58. A spring 124 that is interposed between the disc 81 and the casing section 73 is effective to normally bias the diaphragm 77 against this valve seat 119. Likewise, an annular chamber 125 formed by the cooperative relationship of the diaphragm 77 and the annular member 117 and disposed in surrounding relation to the annular valve seat 119 is open to atmosphere via the bore 121, passageway 122 and choke 123.

OPERATION - FIG. 3

As in the previous embodiments of the invention, when the emergency graduating valve 50 moves to the position in which it is shown in FIG. 1 of the drawings, fluid under pressure will flow from the quick action chamber 43 to the pipe 13 and thence via the passageway 115 (FIG. 3) and bore 120 to that portion of the lower side of the diaphragm 77 within the annular valve seat 119. When the pressure acting on the lower side of the diaphragm 77 and within the annular valve seat 119 has increased sufficiently to establish a fluid pressure force that acts in an upward direction and is in excess of the downwardly acting force of the spring 124, the diaphragm 77 will be deflected upward and out of contact with the annular valve seat 119, it being noted that, while the parts of the quick service valve device 72 occupy the position shown in FIG. 3, the upper end of the valve stem 82 is disposed a short distance below the lower side of the valve 94 in order that the diaphragm 77 can be deflected upward out of contact with the annular valve seat 119 without effecting unseating of the valve 94 from its seat 87.

As soon as the diaphragm 77 is deflected upward out of contact with the annular valve seat 119, the effective area of the entire lower side of this diaphragm is subject to the fluid under pressure being supplied from the quick action chamber 43 (FIG. 1). Consequently, when the effective area of the lower side of the diaphragm 77 (FIG. 3) is thus greatly increased, the fluid under pressure supplied thereto from the quick action chamber 43 will deflect this diaphragm upward with a snap action until the annular valve 80 is moved into seating contact with the annular valve seat 79. This upward deflection of the diaphragm 77 moves the valve stem 82 upward therewith to cause it to unseat valve 94 from its seat 87 against the yielding resistance of the spring 97.

When the valve 94 is unseated from its seat 87 in the manner just explained, fluid under pressure will flow from the brake pipe 1 to the quick service volume reservoir 99 via branch pipe 7, passageway 92, chamber 93, past now unseated valve 94, bore 86, counterbore 85, and passageway and corresponding pipe 98.

The fluid under pressure thus supplied to the quick service volume reservoir 99 will flow therefrom to the area of the upper side of the check valve 102 within the annular valve seat 101 via pipe and passageway 100. Consequently, when the pressure in the quick service volume reservoir 99 and acting on the upper side of the check valve 102 within the annular valve seat 101 is increased sufficiently to establish a fluid pressure force that exceeds the force of the spring 109, the check valve 102 will be unseated from its seat 101.

When the check valve 102 is thus unseated from the seat 101, fluid under pressure will flow from the quick service volume reservoir 99 to the chamber 110 and act over the effective area of the entire upper side of the diaphragm 104 to deflect this diaphragm downward with a snap action against the yielding resistance of the spring 109 until the fluid pressure force acting on the upper side of the diaphragm 104 is balanced by the force of the spring 109 acting on the lower side.

Fluid under pressure supplied to the chamber 110 in the manner just explained will flow therefrom to the area of the valve 80 within the annular valve seat 79 via the passageway 111 and pipe and passageway 112.

Since the diaphragm 77 is now unseated from the annular valve seat 119, fluid under pressure at this time is being released at a restricted rate from the chamber 125 below this diaphragm to atmosphere via the bore 121, passageway 122 and choke 123.

Furthermore, fluid under pressure at this time is being released at a restricted rate from this chamber 125 to atmosphere via the bore 120, passageway 115, pipes 13 and 54, choke 55a, pipe 56, check valve 57 and pipe 58, and also via the choke 59. The sizes of the chokes 123 and 55a are such that, as in the previous embodiments of the invention, the fluid under pressure that is flowing from the quick action chamber 43 (FIG. 1) to the chamber 125 is released to atmosphere at the same rate as fluid under pressure is released from the upper side of the diaphragm 44 of the emergency portion 39 so that this emergency portion does not move to its emergency position to cause an undesired emergency brake application.

Since fluid under pressure is now being released from the chamber 125 and the lower side of the diaphragm 77 to atmosphere at a restricted rate in the manner just described, it is apparent that the fluid under pressure supplied from the quick service volume 99 to the area of the valve 80 within the annular valve seat 79 will quickly establish a fluid pressure force that acts in a downward direction which force, together with the force of the spring 124, exceeds the now decreasing fluid pressure force acting in an upward direction on the lower side of the diaphragm 77. Therefore, the valve 80 will be moved downward out of seating contact with the annular valve seat 79.

When the valve 80 is thus unseated from valve seat 79, the fluid under pressure being supplied from the quick service volume reservoir 99 will act on the effective area of the entire upper side of the diaphragm 77 whereupon valve 80 and diaphragm 77 will be deflected downward with a snap action until the lower side of this diaphragm 77 abuts the annular valve seat 119.

When the diaphragm 77 is thus deflected downward, the valve stem 82 is moved downward therewith whereupon the spring 97 is rendered effective to move the piston 95 and valve 94 downward until this valve 94 is seated on its seat 87 to thereby terminate flow of fluid under pressure from the brake pipe 1 to the quick service volume reservoir 99.

It will be noted from FIG. 3 that this fluid under pressure from the quick service volume reservoir 99 which now acts on the effective area of the entire upper side of the diaphragm 77 can flow to atmosphere at a restricted rate via the passageway 113 and the choke 114 therein. Consequently, fluid under pressure from the quick service volume reservoir 99 and the upper side of the diaphragm 77 will flow to atmosphere at a rate determined by the size of the choke 114 so that the fluid pressure force acting on the upper side of both the diaphragm 77 and also the diaphragm 104 will be reduced. Accordingly, when the fluid pressure force acting on the upper side of the diaphragm 104 is reduced to a value slightly less than the force of the spring 109 acting upward on this diaphragm, this spring 109 will deflect diaphragm 104 upward to seat check valve 102 on its seat 101 thereby terminating the flow of fluid under pressure from the quick service volume reservoir 99 to atmosphere via the choke 114.

Subsequent to the seating of the check valve 102 on its seat 101, the fluid under pressure acting over the effective area of the entire upper side of the diaphragm 77 will flow to atmosphere via the passageway 113 and the choke 114 at a restricted rate determined by the size of this choke 114. Since the effective area of the entire upper side of the diaphragm 77 is substantially greater than the area of the lower side of this diaphragm within the annular valve seat 119 against which this lower side of the diaphragm is now seated, it is apparent that the pressure acting on the effective area of the entire upper side of the diaphragm 77 must be reduced to a value that is substantially less than the pressure acting on the lower side within the annular valve seat 119 before a differential of pressure that acts in an upward direction is established that is great enough to overcome the downwardly acting force of the spring 124 and the now reducing fluid pressure force of the fluid under pressure acting on the effective area of the entire upper side of this diaphragm. Consequently, when the pressure acting on the effective area of the entire upper side of the diaphragm 77 is reduced by flow of fluid under pressure to atmosphere via choke 114 to such a low value that the fluid under pressure acting on the lower side of this diaphragm within the annular valve seat 119 is able to establish a fluid pressure force that acts in an upward direction and exceeds the sum of the fluid pressure force and the force of the spring 124 acting in a downward direction, this fluid pressure force acting in an upward direction will unseat the diaphragm 77 from the annular valve seat 119 whereupon the effective area of the entire lower side of the diaphragm will be subject to the fluid under pressure supplied thereto from the quick action chamber 43.

When the diaphragm 77 is thus unseated from the annular valve seat 119, the effective area of the entire lower side of this diaphragm is subject to the fluid under pressure supplied thereto from the quick action chamber 43. Consequently, the diaphragm 77 will be deflected upward with a snap action until the valve 80 is seated on the annular valve seat 79, it being noted that the valve 94 is unseated from its seat 87 prior to movement of the valve 80 into seating contact with the annular valve seat 79.

When the valve 94 is thus unseated, fluid under pressure will again flow from the brake pipe 1 to the quick service volume reservoir 99 to further reduce the pressure in the brake pipe 1.

This flow of fluid under pressure to the quick service volume reservoir 99 will cause the quick service value device 72 to operate in the manner hereinbefore described to cause reseating of the valve 94 on its seat 87.

From the foregoing description of the operation of the continual quick service valve device 72, it is apparent that this valve device will operate to repeatedly supply fluid under pressure from the brake pipe 1 to the quick service volume reservoir 99 and then release this fluid under pressure to atmosphere until the pressure therein is reduced sufficiently for the spring 109 to seat the check valve 102 on its seat 101 so long as the control valve device 3 remains in its service position and fluid under pressure is supplied from the quick action chamber 43 to the pipe 13 and passageway 115 in the quick service valve device 72.

Having now described the invention, what we claim as new and desire to secure by Letters Patent, is:

1. In a fluid pressure brake equipment, the combination of a brake pipe, an auxiliary reservoir, and a brake control valve device having a quick action chamber, a triple valve mechanism subject to the opposing pressures of the brake pipe and auxiliary reservoir and operative to effect service applications and releases of the brakes, an emergency valve mechanism subject to the opposing pressures of the brake pipe and quick action chamber and operative to effect emergency applications and release of the brakes, and means operative upon effecting a service brake application to release fluid under pressure from the quick action chamber and a continual quick service valve device comprising:
   a. a quick service volume,
   b. a first valve means for controlling flow of fluid under pressure from the brake pipe to said quick service volume,
   c. a second valve means for controlling flow of fluid under pressure from said quick service volume to atmosphere, and wherein the improvement comprises:
   d. a movable abutment subject to the opposing pressures of the fluid under pressure released from the quick action chamber and that in said quick service volume, and so constructed and connected to said first and second valve means as to cause successive sequential operation thereof so long as one side of said abutment is subject to said fluid under pressure released from said quick action chamber.

2. A continual quick service valve device, as recited in claim 1, further characterized in that said first valve means includes a spool-type valve provided with a longitudinally arranged peripheral annular groove which carries an O-ring seal which, upon movement of said valve means to a position in which a communication is established between the brake pipe and said quick service volume, is movable by fluid under pressure from one end of said groove to the other end.

3. A continual quick service valve device, as recited in claim 1, further characterized in that said first valve means includes a spool-type valve provided with a longitudinally arranged peripheral annular groove that carries therein an O-ring seal which, upon movement of said valve means to a position in which a communication is established between the brake pipe and said quick service volume, is movable by fluid under pressure from one end of said groove to the other end, and which, upon subsequent movement of said valve means to a position in which said communication between the brake pipe and said quick service volume is closed, is movable by fluid under pressure from said other end of said groove to said one end.

4. A continual quick service valve device, as recited in claim 1, further characterized in that said first valve means includes a cylindrical valve member, and that a lost-motion connection is provided between said movable abutment and said cylindrical valve member to render said cylindrical valve member operative by said movable abutment to establish a communication between the brake pipe and said quick service volume after said second valve means is operated thereby to close communication between said quick service volume and atmosphere.

5. A continual quick service valve device, as recited in claim 1, further characterized in that said first valve means includes a cylindrical valve member that carries a pair of spaced-apart seals, and that a lost-motion connection is provided between said movable abutment and said cylindrical valve member to render said cylindrical valve member operative by said movable abutment to establish a communication between the brake pipe and said quick service volume after said second valve means is operated thereby to close communication between said quick service volume and atmosphere, and to render said cylindrical valve member operative by said movable abutment to close communication between the brake pipe and said quick service volume after said second valve means is operated thereby to establish a communication between said quick service volume and atmosphere.

6. A continual quick service valve device, as recited in claim 1, further characterized in that said first valve means comprises:
   a. an annular valve seat,
   b. a valve,
   c. biasing means for normally biasing said valve into seating contact with said annular valve seat, and
   d. a valve operating stem having one end abutting said movable abutment, the other end being so disposed within said annular valve seat as to effect unseating of said valve from said seat upon movement of said movable abutment in one direction a chosen amount.

7. A continual quick service valve device, as recited in claim 1, further characterized in that said first valve means comprises:
   a. an annular valve seat,
   b. a valve,
   c. biasing means for normally biasing said valve into seating contact with said annular valve seat, and
   d. a valve operating stem having one end abutting said abutment, the other end being so disposed within said annular valve seat and at such a distance below said valve while seated on said seat as to effect unseating of said valve from said seat upon movement of said movable abutment in one direction before said second valve means is operated thereby to close communication between said quick service volume and atmosphere.

8. A continual quick service valve device, as recited in claim 1, further characterized in that said first valve means comprises:
   a. an annular valve seat,
   b. a valve,
   c. biasing means for normally biasing said valve into seating contact with said annular valve seat, and
   d. a valve operating stem having one end abutting said abutment, the other end being so disposed within said annular valve seat and at such a distance below said valve while seated on said seat as to effect unseating of said valve from said seat as to effect unseating of said valve from said seat upon movement of said abutment in one direction before said second valve means is operated thereby to close communication between said quick service volume and atmosphere, and to render said biasing means effective to reseat said valve on said seat only subsequent to operation of said second valve means by fluid under pressure to reestablish said communication between said quick services volume and atmosphere.

9. A continual quick service valve device, as recited in claim 1, further characterized in that said second valve means comprises:
   a. an annular valve seat, and
   b. an annular valve member carried on one side of said abutment and movable into seating contact with said seat upon subjecting the other side of said abutment to the fluid under pressure released from the quick action chamber to effect a substantial reduction in the effective area of said one side of said abutment whereby the pressure subsequently required in said quick service volume and acting on the reduced effective area of said one side of said abutment to subsequently unseat said annular valve member from said annular valve seat is a chosen multiple of the pressure acting on the effective area of said other side of said abutment.

10. A continual quick service valve device, as recited in claim 1, further characterized by means operative to bleed down the fluid under pressure released from the quick action chamber.

11. A continual quick service valve device, as recited in claim 1, further characterized by means operative to bleed down at a restricted rate the fluid under pressure released from the quick action chamber, said means comprising:
 a. a first choke,
 b. a check valve device connected in series relation to said first choke, and
 c. a second choke connected in by-pass relation to said check valve whereby the fluid under pressure effective on one side of said abutment subsequent to the seating of said check valve device is released from said one side to atmosphere via said first and said second chokes in series.

12. A continual quick service valve device, as recited in claim 9 further characterized by means restricting flow of fluid under pressure from said quick service volume to atmosphere while said annular valve member is unseated from said annular valve seat.

13. A continual quick service valve device, as recited in claim 9, further characterized by a spring-biased check valve interposed between said quick service volume and said annular valve seat whereby, upon operating of said check valve, a chosen pressure, corresponding in degree to said spring bias, is always supplied to the area of said annular valve member within said annular valve seat to insure unseating of said annular valve member from said annular valve seat so long as the pressure acting on the effective area of the entire lower side of said abutment is not in excess of a chosen value, a pressure in excess of said chosen value being obtained only upon said emergency valve mechanism effecting an emergency brake application, said spring-biased check valve being operative to always retain a chosen pressure in said quick service volume.

14. A continual quick service valve device, as recited in claim 9, further characterized by means for reducing the effective area of said other side of said abutment subject to the fluid under pressure released from the quick action chamber upon the fluid pressure force acting on said one side of said abutment exceeding the fluid pressure force acting on said other side.

15. A continual quick service valve device, as recited in claim 14, further characterized by a choke for venting fluid under pressure from said other side of said abutment to atmosphere at a restricted rate, said choke being so located that, subsequent to operation of said means to reduce the effective area of said other side of said abutment that is subject to the fluid under pressure released from the quick action chamber, it is thereafter ineffective to vent to atmosphere fluid under pressure released from the quick action chamber and effective on said reduced effective area of said other side of said abutment.

16. A continual quick service valve device, as recited in claim 14, further characterized by a choke for venting fluid under pressure from said one side of said abutment to atmosphere at a restricted rate, said choke being so located that, subsequent to seating of said annular valve member on said annular valve seat, it is thereafter ineffective to vent to atmosphere the fluid under pressure in said quick service volume and effective to vent to atmosphere the area of the upper side without said annular valve seat.

* * * * *

PO-1050
(5/69)

UNITED STATES PATENT OFFICE
CERTIFICATE OF CORRECTION

Patent No. 3,716,276      Dated February 13, 1973

Inventor(s) Richard L. Wilson & Daniel G. Scott

It is certified that error appears in the above-identified patent and that said Letters Patent are hereby corrected as shown below:

Column 3, line 34, "tee" should be --the--

Column 8, line 41, "volume 23" should be --volume 33--

Column 9, line 16, "ag" should be --and--

Column 13, line 2, "lostemotion" should be --lost-motion--

Column 22, lines 39 & 40, delete "as to effect unseating of said valve from said seat"

Column 23, line 29, "operating" should be --opening--

Column 24, line 1, "value", first and second occurrences, should be "pressure"

lines 2 & 3, delete "upon said emergency valve mechanism effecting" and insert --when the rate of brake pipe pressure reduction is a predetermined rate less than-- line 3, "brake application" should be --rate-- line 23, delete "on said reduced effective" and insert --to vent to atmosphere the-- line 24, after "abutment" insert --other than the reduced area that is subject to the fluid under pressure released from the quick action chamber-- line 33, after "side" insert --of said abutment--

Signed and sealed this 10th day of July 1973.

(SEAL)
Attest:

EDWARD M. FLETCHER, JR.
Attesting Officer

RENE TEGTMEYER
Acting Commissioner of Patents